US005498280A

United States Patent [19]
Fistner et al.

[11] Patent Number: 5,498,280
[45] Date of Patent: Mar. 12, 1996

[54] PHOSPHORESCENT AND FLUORESCENT MARKING COMPOSITION

[75] Inventors: David C. Fistner; Colin M. Snedeker, both of Bethlehem, Pa.

[73] Assignee: Binney & Smith Inc., Easton, Pa.

[21] Appl. No.: 338,694

[22] Filed: Nov. 14, 1994

[51] Int. Cl.$^6$ .................................................. C09D 13/00
[52] U.S. Cl. ...................... 106/19 B; 106/21 A; 106/21 R
[58] Field of Search ............................ 106/19 B, 21 R, 106/21 A

[56]  References Cited

U.S. PATENT DOCUMENTS

| | | | |
|---|---|---|---|
| 257,708 | 5/1882 | Horne | 119/10 |
| 2,297,033 | 9/1942 | Stahr | 252/301.34 |
| 2,396,219 | 11/1942 | Weagle | 106/19 R |
| 2,567,964 | 9/1951 | Petke | 106/22 R |
| 2,567,965 | 9/1951 | Petke | 106/22 R |
| 2,851,423 | 9/1958 | Gaunt | 252/301.2 |
| 2,940,937 | 6/1960 | O'Brien | 252/301.2 |
| 2,970,965 | 2/1961 | Switzer | 252/301.2 |
| 3,057,806 | 10/1962 | Switzer | 252/301.2 |
| 3,116,256 | 12/1963 | D'Alelio | 252/301.2 |
| 3,412,104 | 11/1968 | McIntosh | 106/20 R |
| 3,429,825 | 2/1969 | Voedisch | 252/301.2 |
| 3,455,856 | 7/1969 | Voedisch | 252/301.2 |
| 3,518,205 | 6/1970 | Vukasovich | 252/301.3 |
| 3,620,993 | 11/1971 | Takano et al. | 252/301.3 |
| 3,640,889 | 2/1972 | Stewart | 252/301.2 R |
| 3,642,650 | 2/1972 | McIntosh | 252/301.2 R |
| 3,671,451 | 6/1972 | Butterfield | 252/301.2 R |
| 3,741,907 | 6/1973 | Beyerlin et al. | 252/301.2 R |
| 3,753,921 | 8/1973 | Noetzel et al. | 252/301.2 R |
| 3,769,229 | 10/1973 | Noetzel et al. | 252/301.2 R |
| 3,779,780 | 12/1973 | Dyson | 106/27 R |
| 3,785,989 | 1/1974 | Noetzel et al. | 252/301.2 R |
| 3,795,628 | 3/1974 | Noetzel et al. | 252/301.2 R |
| 3,812,051 | 5/1974 | Merkle et al. | 252/301.2 R |
| 3,812,053 | 5/1974 | Noetzel et al. | 252/301.2 R |
| 3,812,054 | 5/1974 | Noetzel | 252/301.2 R |
| 3,838,063 | 9/1974 | Foss | 252/301.2 R |
| 3,939,093 | 2/1976 | Papenfuhs et al. | 252/301.2 R |
| 3,993,492 | 11/1976 | Woolly | 106/19 B |
| 4,186,020 | 1/1980 | Wachtel | 106/21 R |
| 4,229,334 | 10/1980 | Klabacka et al. | 106/19 B |
| 4,525,295 | 6/1985 | Lister | 252/301.36 |
| 4,708,817 | 11/1987 | Dudnick | 252/301.16 |
| 4,725,316 | 2/1988 | Mahany, II | 106/499 |
| 4,975,220 | 12/1990 | Streitel et al. | 252/301.35 |
| 4,978,390 | 12/1990 | Snedeker | 106/19 B |
| 4,990,013 | 2/1991 | Hejmanowski | 106/19 B |
| 5,084,098 | 1/1992 | Olson | 106/19 B |
| 5,084,327 | 1/1992 | Stengel | 252/301.35 |
| 5,091,006 | 2/1992 | Sarada et al. | 252/301.35 |
| 5,100,580 | 3/1992 | Powell et al. | 252/301.35 |
| 5,116,533 | 5/1992 | Grandmont et al. | 106/19 B |
| 5,131,916 | 7/1992 | Eichenauer et al. | 8/527 |
| 5,135,569 | 8/1992 | Mathias | 106/22 B |
| 5,174,814 | 12/1992 | Burwell et al. | 106/19 R |
| 5,215,679 | 6/1993 | Cramm et al. | 252/301.35 |
| 5,308,546 | 5/1994 | Hansen et al. | 252/301.36 |

*Primary Examiner*—Helene Klemanski
*Attorney, Agent, or Firm*—Leydig, Voit & Mayer, Ltd.

[57] ABSTRACT

A phosphorescent and fluorescent marking composition, e.g., a crayon, comprising both high and low molecular weight polyethylene glycols in combination with phosphorescent and fluorescent pigments. The composition advantageously preferably further includes at least one filler, which preferably includes a water-miscible filler, a water-soluble surfactant, and a plasticizer.

27 Claims, No Drawings

PHOSPHORESCENT AND FLUORESCENT MARKING COMPOSITION

FIELD OF THE INVENTION

This invention relates to marking compositions and marking instruments which contain such compositions, e.g., crayons.

BACKGROUND OF THE INVENTION

Marking instruments in the form of crayons have been used by young and old for decades. Historically, crayons have been manufactured by mixing together a binder, the binder typically constituting a molten wax, and a suitable pigment. The molten mixture would then be extruded into a desired shape, e.g., a cylinder, and subsequently cooled to effect solidification of the mixture. The resulting crayon, when rubbed on a surface, such as paper, would leave a mark, i.e., a residue of pigmented wax, on the paper's surface.

Over the years, the crayon has undergone a number of changes to improve its appearance, mechanical properties, and marking properties, as well as its toxicity. One of these changes, which affects at least the appearance of the crayon, is that relating to pigments. The introduction of new pigments over the years has provided crayon developers with the ability to produce crayons having a variety of vivid and attractive colors. This increase in the availability of colors and hues in crayons has fueled the demand for further improvements in the properties of crayons, generally. One of the areas of crayon development which has been affected by the foregoing may be characterized as the area of "special effects."

One of these special effects is phosphorescence. Phosphorescence is achieved by the use of phosphors, which are substances which emit light when excited by radiation. Phosphors have been known for years, and have been incorporated into different types of marking compositions. By way of example, a phosphorescent marking composition in the form of a crayon, pencil or chalk was described and patented in 1882 (Horne, U.S. Pat. No. 257,706). This marking device, however, is relatively unsophisticated, being comprised of a phosphorescent substance, pipe clay, curd soap, gum arabic, and water. A more recent example of a phosphorescent marking material, which comprises a wax base vehicle, filler particles, and phosphorescent particles, is described in U.S. Pat. No. 5,116,533.

Another aspect of the special effect area is fluorescence. This property is obtained by the use of fluorescers, which are substances which emit electromagnetic radiation (usually as visible light) resulting from (and occurring only during) the absorption of radiation from some other source. Examples of pigments which fluoresce under daylight conditions are described in U.S. Pat. No. 3,939,093. Such fluorescent pigments have also been included in marking compositions, e.g., U.S. Pat. No. 3,057,806, which describes fluorescent crayons.

One U.S. patent which discloses pigment compositions which comprise a combination of common pigments, phosphorescent pigments, and fluorescent pigments, is U.S. Pat. No. 4,725,316. These pigment compositions are said to be combinable with translucent plastics, resins, and natural and synthetic rubbers. However, there is no mention of their use in connection with crayons.

Another area of crayon technology which has undergone significant change over the years is the composition of the binder component. The natural waxes, which were historically used as binders, have been improved through blending and the inclusion of additives. In addition, synthetic materials have been developed which provide, among other advantages, a more uniform distribution of pigment throughout the crayon, and the ability to successfully mark a relatively wider variety of surfaces.

One patent which is exemplary of those in which synthetic binders are included in a crayon composition is U.S. Pat. No. 4,978,390. The compositions disclosed therein comprise, generally, polyethylene glycols, a pigment, certain other alcohols, and other components. This patent specifically states, however, that only certain polyethylene glycol binders be used in the composition— those having a molecular weight of above 7,000. Polyethylene glycols having a molecular weight below 7,000 should be avoided, according to the patent.

The formulation of any marking composition which is intended to be used in the form of a crayon should further be developed so that the crayon provided thereby possesses good appearance, good mechanical and marking properties, and relatively low toxicity. More particularly, a crayon should advantageously possess sufficient mechanical strength so it can successfully withstand rubbing on a surface without undue crumbling or breaking. Moreover, the crayon, when rubbed on a surface, should advantageously provide a relatively uniform laydown, i.e., a relatively smooth and uniform layer of the crayon composition on the surface—without undue flaking. Further, the crayon should provide a mark which is substantially clean, and uniform, in coloration. In addition, the crayon should not be unduly hygroscopic in nature, i.e., it should not absorb water to the extent that it acquires a wet feel and looses mechanical strength.

Obtaining satisfactory levels of performance in regard to all of the foregoing properties has not, however, been a simple matter. On the contrary, such has been found to be problematic when new crayon formulations are developed using components which have not previously been included together in a crayon composition.

Thus, one of the objects of the present invention is to provide a marking composition, e.g., a crayon, which possesses an enhanced level of special effects.

A further object of the present invention is to provide a special effects marking composition which is able to provide a high quality mark on a variety of surfaces.

Another object of the present invention is to provide a special effects marking composition which possesses good mechanical strength.

Yet another object of the present invention is to provide a special effects marking composition which possesses good appearance.

An additional object of the present invention is to provide a special effects marking composition which possesses a relatively low level of hygroscopicity.

A further object of the present invention is to provide a special effects marking composition which possesses a relatively low level of toxicity.

These and other objects and advantages of the present invention, as well as additional inventive features, will be apparent from the description of the invention provided herein.

SUMMARY OF THE INVENTION

The present invention provides a marking composition having an enhanced level of special effects which, when provided in the form of a crayon, provides a high quality mark on a variety of surfaces (e.g., has good laydown and color uniformity), has good mechanical strength and appearance, and relatively low levels of hygroscopicity and toxicity.

The marking composition of the present invention comprises a high molecular weight (at least about 10,000) polyethylene glycol (PEG), a low molecular weight (from about 100 to about 1000) PEG, a phosphorescent pigment, and a fluorescent pigment.

DETAILED DESCRIPTION OF THE PREFERRED EMBODIMENT

The present invention comprises a marking composition which provides a certain special affect which, it is believed, has not been available previously. More particularly, the composition possesses both phosphorescence and fluorescence, which provides crayons prepared from such compositions unique and appealing to young and old alike. Specifically, such crayons, and marks made using such crayons, will fluoresce under ordinary lighting conditions, e.g., sunlight or illuminated rooms, and also phosphoresce (glow) in a darkened area when the crayon or mark is taken from an illuminated area to the darkened area.

In addition to providing the aforementioned properties, the composition, when formed into a crayon, also provides other highly desirable advantages. For example, it is able to provide a high quality mark on a variety of surfaces, e.g., it has good laydown and color uniformity, has good mechanical strength and appearance, as well as relatively low levels of hygroscopicity and toxicity.

The composition itself comprises: a high molecular weight PEG having a molecular weight of at least about 10,000; a low molecular weight PEG having a molecular weight ranging from about 100 to about 1,000; a phosphorescent pigment; and a fluorescent pigment.

The high molecular weight PEG should have an average molecular weight of at least about 10,000. It has been found that PEG's of this molecular weight, in the present composition, provide certain benefits. One of these benefits is the ability to assist in imparting a certain degree of mechanical strength to the composition. This is significant because crayons should possess a certain level of strength to withstand the rubbing that must be undertaken to produce a mark from the crayon. These PEG's have been found to be of significant assistance in providing such strength. An additional benefit of these PEG's was found in respect to their hygroscopic properties. More particularly, it was found that such PEG's did not readily absorb water, and thereby have the effect of not adding to the hygroscopic properties of the composition, thereby effectively lowering the overall hygroscopic level of the composition. This is of significance in the preparation of crayons because a high hygroscopic level not only causes the crayon to feel wet, but adversely effects the mechanical strength of the crayon. It was further found that these PEG's assisted in suspending the relatively large phosphorescent pigments in the composition, providing uniformity in the phosphorescent pigment distribution during processing of the composition into a crayon, and providing for the uniform distribution of that pigment in a mark made using the resulting crayon.

Advantageously, the molecular weight of the high molecular weight PEG's may range above about 15,000, and may preferably range between about 17,000 and about 23,000. PEG's within this range were found to provide optimal performance in the areas of mechanical strength, hygroscopic levels, and phosphorescent pigment suspension. An example of a preferred PEG is the water-miscible PEG, Carbowax® 20M (Union Carbide).

This component should generally be included in an amount which is sufficient to provide the composition with the desired level of strength, hygroscopic properties, and phosphorescent suspension capability, without also providing the composition with a viscosity which is too high to be processed into a useful article, e.g., a crayon. Advantageously, this high molecular weight PEG should be provided in an amount ranging from about 3 wt. % to about 30 wt. %, and preferably from about 5 wt. % to about 10 wt. %, of the composition.

In addition to a high molecular weight PEG, the composition further includes a low molecular weight PEG. This PEG has a molecular weight of between about 100 and 1,000. It was found that, in respect to the present composition which includes fluorescent and phosphorescent pigments, inadequate laydown was experienced in the absence of such a low molecular weight PEG. Thus, a sufficient level of this PEG should advantageously be provided in the composition so that the composition, if formulated into a crayon, possesses good laydown and other marking properties, e.g., providing for an even distribution of the composition onto a substrate, and the ability to mark a substrate without the application of undue force to the crayon. However, and advantageously, the amount of this component should be limited so that the mechanical properties of the crayon are not unduly compromised.

More advantageously, the ratio of the high molecular weight polyethylene glycol to the low molecular weight polyethylene glycol in the composition, on a weight percent basis, is from about 2:1 to about 1:1. On an absolute basis, this low molecular weight PEG is advantageously present in an amount ranging from about 2 wt. % to about 50 wt. %, preferably from about 3 wt. % to about 20 wt. %, and most preferably from about 5 wt. % to about 15 wt. %, based upon the weight of the composition.

Preferably, the low molecular weight PEG comprises a PEG having a molecular weight of from about 400 to about 800. Exemplary of such a PEG is a water-miscible PEG, Carbowax® 540 (Union Carbide).

A further component of the marking composition is a phosphorescent pigment which provides the composition with its "glow in the dark" property. Any phosphorescent pigment may be used in the composition, so long as it does not adversely affect the marking characteristics of the composition, or adversely interact with any of the other components of the composition. For example, in the case of calcium sulfide phosphors, hydrogen sulfide gas could be released therefrom, in which case a different phosphorescent pigment should be used, or the calcium sulfide phosphor should be encapsulated.

Examples of phosphorescent pigments which are suitable for use in the present marking composition include, among others, zinc sulfide phosphors, aluminate phosphors, and calcium sulfide phosphors. Zinc sulfide phosphors are a preferred type of phosphor for use in the marking composition because of their relatively high luminous intensity, stability when contacted with water, and low toxicity.

In addition to the foregoing considerations, it was found that it was also desirable that the average particle size of the phosphors be within a certain range. More specifically, if the average particle size is too small, the "glow" provided thereby will lack intensity and duration. If, on the other hand, the average particle size is too large, the laydown will be adversely affected, e.g., it will become vary scratchy when the crayon is rubbed against a writing surface. This scratchiness prevents a build-up of crayon material on the surface because repeated rubbing tends to scrape off previously laid-down material. It was determined that the particle size may preferably range from about 11 microns to about 15 microns, with a particle size of about 14 microns being most preferred.

In addition to the size of the particles, the amount of phosphorescent pigment included in the marking composition was also determined to be of significance. For example, too little phosphor in the composition will not produce a sufficient level of "glow," while an excessive level will affect laydown by providing a harder crayon which writes less smoothly and by decreasing the crayon's mechanical strength. Advantageously, the amount of phosphorescent pigment that is included in the composition may range from about 5 wt. % to about 50 wt. %, based on the weight of the composition. Preferably, the amount of phosphorescent pigment in the composition may range from about 15 wt. % to about 25 wt. %, and most preferably it will constitute an amount of about 20 wt. % of the composition.

The present marking composition further comprises a fluorescent pigment. This pigment provides the "day glow" properties to the marking composition. As was the case in respect to the phosphorescent pigment, any fluorescent pigment may be used so long as it does not adversely effect the marking characteristics of the composition, or adversely interact with any of the other components of the composition.

Further, however, the amount of pigment that is included will have an impact on the properties of the composition. For example, if too much pigment is used, it will assist in lessening the "glow in the dark" property provided by the phosphorescent pigment. Conversely, too little fluorescent pigment will provide insufficient "day glow" color. Preferably, the fluorescent pigment may be provided up to about 10 wt. % of the composition. More preferably, the fluorescent pigment may be provided so that it comprises from about 0.5 wt. % to about 2.0 wt. % of the composition, and most preferably about 1.6 wt. % thereof.

Other optional components may be included in the marking composition to provide it with certain additional, and desirable, properties. One of these is a filler. The filler selected should be inert in regard to the other components of the composition, and is advantageously selected and provided so as to provide the composition with characteristics which are desirable from a processing perspective.

The composition may comprise up to about 90% by weight of filler. However, the amounts of filler included therein should not be so great as to adversely affect the other desirable properties of the marking composition, such as smoothness of writing, mechanical strength, and color intensity. Advantageously, filler is present in an amount up to about 60 wt. %, preferably from about 15 wt. % to about 50 wt. %, and most preferably from about 25 wt. % to about 40 wt. % of the composition.

Preferably, the filler will comprise both a water-insoluble filler and a water-miscible filler. Examples of suitable water-miscible fillers include hydrocarbon-based water-miscible fillers such as $C_{14-18}$ alcohols, e.g., stearyl alcohol, cetyl alcohol, and myristal alcohol, among others, with stearyl alcohol being preferred. Examples of water-insoluble fillers which are suitable for use include clay, calcium carbonate, talc and mica, with talc being preferred, due to its relatively small particle size and translucence. An example of a preferred talc product is Nytal 400 (R. T. Vanderbilt Co., Inc., Norwalk, Conn.).

When both water-insoluble and water-miscible fillers are included in the composition, they may advantageously be present in certain weight ranges, i.e., in respect to the water-insoluble filler, from about 2 wt % to about 20 wt % and from about 5 wt. % to about 40 wt. % of the water-miscible filler. Preferably, they may be present at from about 5 wt. % to about 15 wt. % and from about 25 wt. % to about 35 wt. %, and most preferably present at about 7 wt. % and about 30 wt. %, respectively.

Another component which is advantageously included in the marking composition is a water-soluble surfactant. This surfactant should be other than a liquid at room temperature, so that it does not adversely affect the marking characteristics of a crayon formed using the composition. Further, and advantageously, the surfactant should possess good dimensional stability and exist as a solid or semi-solid material, such as a paste, at room temperature. The surfactant functions in various ways, e.g., modifies the consistency of the composition, thereby modifying the marking characteristics of the composition, enhances the laydown of the composition, enhances the compatibility of the various components of the composition, facilitates the mixing of the composition by acting as a dispersant for the various non-soluble components of the composition, particularly the pigments, and contributes to the release of the composition from a mold.

Preferably, the surfactant is one or more of a mono ester of a polyol or fatty acid, a diester of a polyol or fatty acid, a nonionic block copolymer of propylene oxide and ethylene oxide, an ethylene oxide condensation product, a nonylphenol ethoxylate, an ethyleneoxy ethanol, or a polyoxyethylene ether alcohol. Using mixtures of these materials is advantageous when preparing articles containing the present composition under specific manufacturing conditions, and for obtaining a proper balance of properties in a particular form of the composition. More specifically, and especially if the composition is to be employed in a gravity-molded crayon product, the surfactant is preferably a PEG monostearate, PEG distearate, glycerol monostearate or a mixture thereof, with a mixture of PEG monostearate and PEG distearate being particularly preferred. The PEG monostearate has been found to provide such a product with a softer laydown, while PEG distearate tends to harden the laydown.

The surfactant is preferably present in the composition in an amount which provides the desired properties in the composition, as set forth in a previous paragraph, without unduly adversely affecting the mechanical properties of a crayon formed therefrom. This amount will generally range up to about 30 wt. % of the composition. Preferably, the surfactant may be included in an amount of from about 10 wt. % to about 20 wt. %, and most preferably in an amount of about 18 wt. % of the composition.

The marking composition may further include a plasticizer. Advantageously, the plasticizer comprises a non-volatile liquid at room temperature. Particular preferred plasticizers are alcohols, with oleyl alcohol being preferred because it possesses high lubricity. The plasticizer, if included in the composition, is advantageously present in an amount which assists in providing the composition with good laydown, while not unduly adversely affecting the mechanical properties of the composition. Advantageously, this component may be present in an amount up to about 10 wt. % of the composition. More preferably, the plasticizer is present in the marking composition in an amount of from about 2.5 wt. % to about 7.5 wt. %, and most preferably in an amount of about 5 wt. %.

The compositions of the present invention may be fabricated in any form of marking utensils, e.g., crayons, by any suitable means. Methods for accomplishing this are well known to those skilled in the art, and accordingly will not be recited herein. Other forms of the present marking composition, e.g., marking pencils and injection molded marking instruments and the like are, of course, within the scope of the present invention. Thus, the following examples are set forth by way of illustration only, and are not intended to limit the scope of the present invention in any manner.

EXAMPLE 1

This example describes the preparation of a crayon prepared in accordance with the present invention.

7.5 wt. % of Carbowax® 20M (a high MW (17,500 to 22,500) PEG, available from Union Carbide), 18.5 wt. % Kessco PEG 6000 DS (a distearate, available from Stepan Company, Northfield, Ill.), 32.4 wt. % TA-1618 (a $C_{14-18}$ alcohol (stearyl alcohol), available from Proctor & Gamble), and 5.0 wt. % Carbowax® 540 (a low MW (500–600) PEG, available from Union Carbide) were mixed in a kettle at 240° F. 7.5 wt. % of Witcohol 85 NF (oleyl alcohol, available from Witco Corporation, Dublin, Ohio) was then added to the mix kettle. Then, in sequence, about 7.5 wt. % Nytal 400 (an industrial talc), 1.6 wt. % fluorescent pigments (from the Radiant MP series of pigments, available from Magruder Color Co., Richmond, Calif.), and 22.5 wt. % phosphorescent pigment (zinc sulfide phosphor pigment, available from USR Optonix, Inc., Hackettstown, N.J.) were added to the mix kettle under high-speed mixing. The resulting marking composition was then molded into crayons.

The crayons prepared thereby glowed in the dark and in the light, had good mechanical strength, reduced hygroscopic properties, increased viscosity, essentially uniform suspension of the phosphorescent and fluorescent pigments, and enhanced laydown.

EXAMPLES 2–6

These examples demonstrate the preparation of crayons prepared in accordance with the present invention.

TABLE A

| | Ex. 2 | Ex. 3 | Ex. 4 | Ex. 5 | Ex. 6 |
|---|---|---|---|---|---|
| Carbowax ® 20M | 8.4 | 7.9 | 8.4 | 8.6 | 8.6 |
| Kessco PEG 6000 DS | 20.8 | 19.4 | 20.8 | 21.2 | 21.2 |
| TA-1618 | 36.5 | 33.8 | 36.5 | 37.0 | 37.0 |
| Witcohol 85 NF | 5.6 | 5.2 | 5.6 | 5.7 | 5.7 |
| Carbowax ® 540 | 5.0 | 5.0 | 5.0 | 5.0 | 5.0 |
| Nytal 400 | 7.5 | 7.5 | 7.5 | 7.5 | 7.5 |
| Nichia NP-231[1] | 15.0 | 20.0 | — | 13.5 | 12.0 |
| MP-BL5527[2] | 1.2 | 1.2 | — | — | — |
| MP-GR5546[3] | — | — | 1.2 | — | — |
| Nichia NP-230[4] | — | — | 15.0 | 1.5 | 3.0 |

[1]Nichia NP-231 is a dysprosium europium strontium aluminate (blue) phosphorescent pigment (Nichia America Corporation, Lancaster, Pennsylvania).
[2]MP-BL5527 is a blue fluorescent microsphere pigment (Magruder Color Co., Richmond, California).
[3]MP-GR5546 is a green fluorescent microsphere pigment (Magruder Color Co., Richmond, California).
[4]Nichia NP-230 is a dysprosium europium strontium aluminate (blue) phosphorescent pigment (Nichia America Corporation, Lancaster, Pennsylvania).

The marking compositions of Examples 2–6 were then molten and molded into crayons. The resulting crayons glowed blue in the dark (the crayon of Example 4, however, glowed green) and appeared blue (the crayon of Example 4, however, appeared green) in the light, had good mechanical strength, reduced hygroscopic properties, increased viscosity, essentially uniform suspension of the phosphorescent and fluorescent pigments, and enhanced laydown.

EXAMPLES 7–11

These examples demonstrate the effect of the low molecular weight PEG on the laydown and hygroscopic properties of the marking compositions.

TABLE B

| | Ex. 7 | Ex. 8 | Ex. 9 | Ex. 10 | Ex. 11 |
|---|---|---|---|---|---|
| Carbowax ® 20M | 8.1 | 7.8 | 7.8 | 7.5 | 7.5 |
| Kessco PEG 6000 DS | 20.0 | 19.2 | 19.2 | 18.5 | 18.5 |
| TA-1618 | 34.9 | 33.7 | 33.7 | 32.4 | 32.4 |
| Witcohol 85 NF | 5.4 | 5.2 | 5.2 | 5.0 | 5.0 |
| Carbowax ® 540 | 0.0 | 2.5 | 2.5 | 5.0 | 5.0 |
| Nytal 400 | 7.5 | 7.5 | 7.5 | 7.5 | 7.5 |
| USR 2330 MBW[1] | 22.5 | 22.5 | 22.5 | 22.5 | 22.5 |
| Radiant Lab MP Series (Ref. 5480)[2] | 1.6 | 1.6 | — | 1.6 | — |
| Radiant Lab MP Series (Ref. 5481)[3] | — | — | 1.6 | — | 1.6 |

[1]USR 2330 MBW is a zinc sulfide phosphorescent pigment (14 μm average pigment diameter) (USR Optonix, Inc., Hackettstown, New Jersey).
[2]Radiant Lab Ref. 5480 is a magenta fluorescent pigment (Magruder Color Co., Richmond, California).
[3]Radiant Lab Ref. 5481 is a fluorescent pigment (Magruder Color Co., red Richmond, California).

The marking compositions of Examples 7–11 were then melted and molded into crayons. The data from these exemplary compositions demonstrate that, as the percent weight composition of low molecular weight PEG increases, the softness of the crayon increases and the laydown of the crayon improves.

EXAMPLES 12–16

These examples demonstrate how the quantity of filler in the composition affects the laydown of the resulting marking composition.

TABLE C

| | Ex. 12 | Ex. 13 | Ex. 14 | Ex. 15 | Ex. 16 |
|---|---|---|---|---|---|
| Carbowax ® 20M | 8.3 | 8.3 | 8.3 | 8.2 | 8.0 |
| Kessco PEG 6000 DS | 20.5 | 20.5 | 20.5 | 20.3 | 19.7 |
| TA-1618 | 35.8 | 35.8 | 35.8 | 35.6 | 34.5 |
| Witcohol 85 NF | 3.6 | 3.6 | 3.6 | 5.4 | 5.3 |
| Carbowax ® 540 | — | — | — | 3.0 | 5.0 |
| Nytal 400 | 11.8 | 11.8 | 11.8 | 7.5 | 7.5 |
| UMC GBU[1] | 20.0 | 19.0 | 19.0 | 19.0 | 19.0 |
| Radiant T1-CH6610 (16-3312)[2] | — | 1.0 | — | — | — |
| Radiant T1-DG6621 (16-3313)[3] | — | — | 1.0 | 1.0 | 1.0 |

[1]UMC GBU is a zinc sulfide phosphorescent pigment (United Mineral & Chemical Corporation, Lyndhurst, New Jersey).
[2]16-3312 is a fluorescent pigment (Magruder Color Co., Richmond, California).
[3]16-3313 is a fluorescent pigment from (Magruder Color Co., Richmond, California).

The marking compositions of Examples 12–16 were melted and molded into crayons. This example demonstrates that, as the weight percent of filler in the composition increases, the crayon becomes harder and flakes, indicating a decrease in laydown.

EXAMPLES 17–21

Further examples of crayon formulations prepared in accordance with the present invention are provided.

TABLE D

|  | Ex. 17 | Ex. 18 | Ex. 19 | Ex. 20 | Ex. 21 |
| --- | --- | --- | --- | --- | --- |
| Carbowax ® 20M | 7.5 | 7.0 | 6.9 | 6.9 | 7.0 |
| Kessco PEG 6000 DS | 18.5 | 17.2 | 17.0 | 17.0 | 17.2 |
| TA-1618 | 32.5 | 30.2 | 29.9 | 29.9 | 30.2 |
| Witcohol 85 NF | 5.0 | 4.6 | 4.6 | 4.6 | 4.6 |
| Carbowax ® 540 | 10.0 | 10.0 | 10.0 | 10.0 | 10.0 |
| Nytal 400 | 10.0 | 12.5 | 10.0 | 10.0 | 5.0 |
| 6SSUY[1] | 15.0 | 17.5 | 20.0 | — | 25.0 |
| Radiant T1-DG6621 (16-3313) | 1.5 | 1.0 | 1.6 | — | 1.0 |
| GSS 305/8[2] | — | — | — | 21.6 | — |

[1]6SSUY is a zinc sulfide phosphorescent pigment (United Mineral & Chemical Corporation, Lyndhurst, New Jersey).
[2]GSS 305/8 is blend of a zinc sulfide phosphorescent pigment (92 wt. %) and a fluorescent pigment (8 wt. %) (United Mineral & Chemical Corporation, Lyndhurst, New Jersey).

The marking compositions of Examples 17–21 were melted and molded into crayons. All of the compositions provided crayons which possessed good phosphorescent and fluorescent properties.

All of the references cited herein, including patents, patent applications, and publications, are hereby incorporated in their entireties by reference.

All percentages set forth herein, unless otherwise specified, are provided in weight percent of the composition.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A marking composition comprising
   (a) a high molecular weight polyethylene glycol having a molecular weight of at least about 10,000;
   (b) a low molecular weight polyethylene glycol having a molecular weight ranging from about 100 to about 1,000;
   (c) a phosphorescent pigment; and
   (d) a fluorescent pigment.

2. The marking composition of claim 1, wherein the ratio of high molecular weight polyethylene glycol to low molecular weight polyethylene glycol in the composition on a weight percent basis is from about 2:1 to about 1:1.

3. The marking composition according to claim 2, wherein the high molecular weight polyethylene glycol is present in an amount ranging from about 3 wt. % to about 30 wt. % and the low molecular weight polyethylene glycol is present in an amount ranging from about 2 wt. % to about 50 wt. %, all based upon the weight of the composition.

4. The marking composition according to claim 3, wherein the high molecular weight polyethylene glycol is present in an amount ranging from about 5 wt. % to about 10 wt. % and the low molecular weight polyethylene glycol is present in an amount ranging from about 3 wt. % to about 20 wt. %, all based upon the weight of the composition.

5. The marking composition of claim 1, wherein the high molecular weight polyethylene glycol has a molecular weight which ranges from about 17,000 to about 23,000.

6. The marking composition of claim 1, wherein the low molecular weight polyethylene glycol has a molecular weight which ranges from about 400 to about 800.

7. The marking composition of claim 1, wherein the total pigment in the composition is at least about 15 wt. %.

8. The marking composition of claim 1, wherein the phosphorescent pigment has an average diameter of about 11 microns to about 15 microns.

9. The marking composition of claim 8, wherein the phosphorescent pigment is present in the composition in an amount of from about 15 wt. % to about 25 wt. %.

10. The marking composition of claim 9, wherein the fluorescent pigment is present in the composition in an amount of from about 0.5 wt. % to about 2.0 wt. %.

11. The marking composition according to claim 1 further comprising a filler.

12. The marking composition of claim 11, wherein the filler is selected from the group consisting of clay, calcium carbonate, talc, mica, and mixtures thereof.

13. The marking composition of claim 12, wherein the filler is present in an amount of up to about 60% by weight.

14. The marking composition of claim 11, wherein the filler comprises a water-miscible filler.

15. The marking composition of claim 14, wherein the water-miscible filler is a stearyl alcohol.

16. The marking composition of claim 15, wherein the stearyl alcohol is present in the composition in an amount of from about 5 wt. % to about 40 wt. %.

17. The marking composition of claim 11 further comprising a surfactant.

18. The marking composition of claim 17, wherein the surfactant is selected from the group consisting of mono esters of polyols and fatty acids, diesters of polyols and fatty acids, nonionic block copolymers of propylene oxide and ethylene oxide, ethylene oxide condensation products, nonylphenol ethoxylates, ethyleneoxy ethanols, polyoxyethylene ether alcohol, and mixtures thereof.

19. The marking composition of claim 18, wherein the surfactant is selected from the group consisting of polyethylene glycol monostearate, polyethylene glycol distearate, glycerol monostearate, and mixtures thereof.

20. The marking composition of claim 19, wherein the surfactant is present in an amount of up to about 30% by weight.

21. The marking composition of claim 17 further comprising a plasticizer.

22. The marking composition of claim 21, wherein the plasticizer is oleyl alcohol.

23. The marking composition of claim 22, wherein the plasticizer is present in an amount of up to 10% by weight.

24. The marking composition of claim 1, wherein the composition comprises:
   (a) from about 3 wt. % to about 30 wt. % of the high molecular weight polyethylene glycol;
   (b) from about 2 wt. % to about 50 wt. % of the low molecular weight polyethylene glycol;
   (c) from about 5 wt. % to about 50 wt. % of the phosphorescent pigment, wherein the phosphorescent pigment has an average particle size of about 11 microns to about 15 microns; and
   (d) up to about 10 wt. % of the fluorescent pigment.

25. The marking composition of claim 24, wherein said composition further comprises:

(e) up to about 90 wt. % of a filler, wherein the filler comprises about 5 wt. % to about 40 wt. % of a water-miscible filler;

(f) up to about 30 wt. % of a surfactant, said surfactant being other than a liquid at room temperature; and (g) up to about 10 wt. % of a plasticizer.

26. The marking composition of claim 25, wherein said composition comprises:

(a) from about 5 wt. % to about 10 wt. % of the high molecular weight polyethylene glycol, wherein the molecular weight of the high molecular weight polyethylene glycol ranges from about 17,000 to about 23,000;

(b) from about 3 wt. % to about 20 wt. % of the low molecular weight polyethylene glycol, wherein the molecular weight of the low molecular weight polyethylene glycol ranges from about 400 to about 800;

(c) from about 15 wt. % to about 25 wt. % of the phosphorescent pigment, wherein the phosphorescent pigment has a particle size of about 14 microns;

(d) from about 0.5 wt. % to about 2 wt. % of the fluorescent pigment;

(e) from about 25 wt. % to about 40 wt. % of the filler, wherein the filler comprises about 25 wt. % to about 35 wt. % of a water-miscible filler;

(f) from about 10 wt. % to about 20 wt. % of the surfactant; and (g) from about 2.5 wt. % to about 7.5 wt. % of the plasticizer.

27. The marking composition of claim 26, wherein said filler is talc, said water-miscible filler is stearyl alcohol, said surfactant is polyethylene glycol distearate, and said plasticizer is oleyl alcohol.

* * * * *